Sept. 6, 1927.  F. A. HUBBARD  1,641,432
SYSTEM FOR DETERMINING THE DIRECTION OF PROPAGATION OF WAVE ENERGY
Filed Jan. 4, 1921
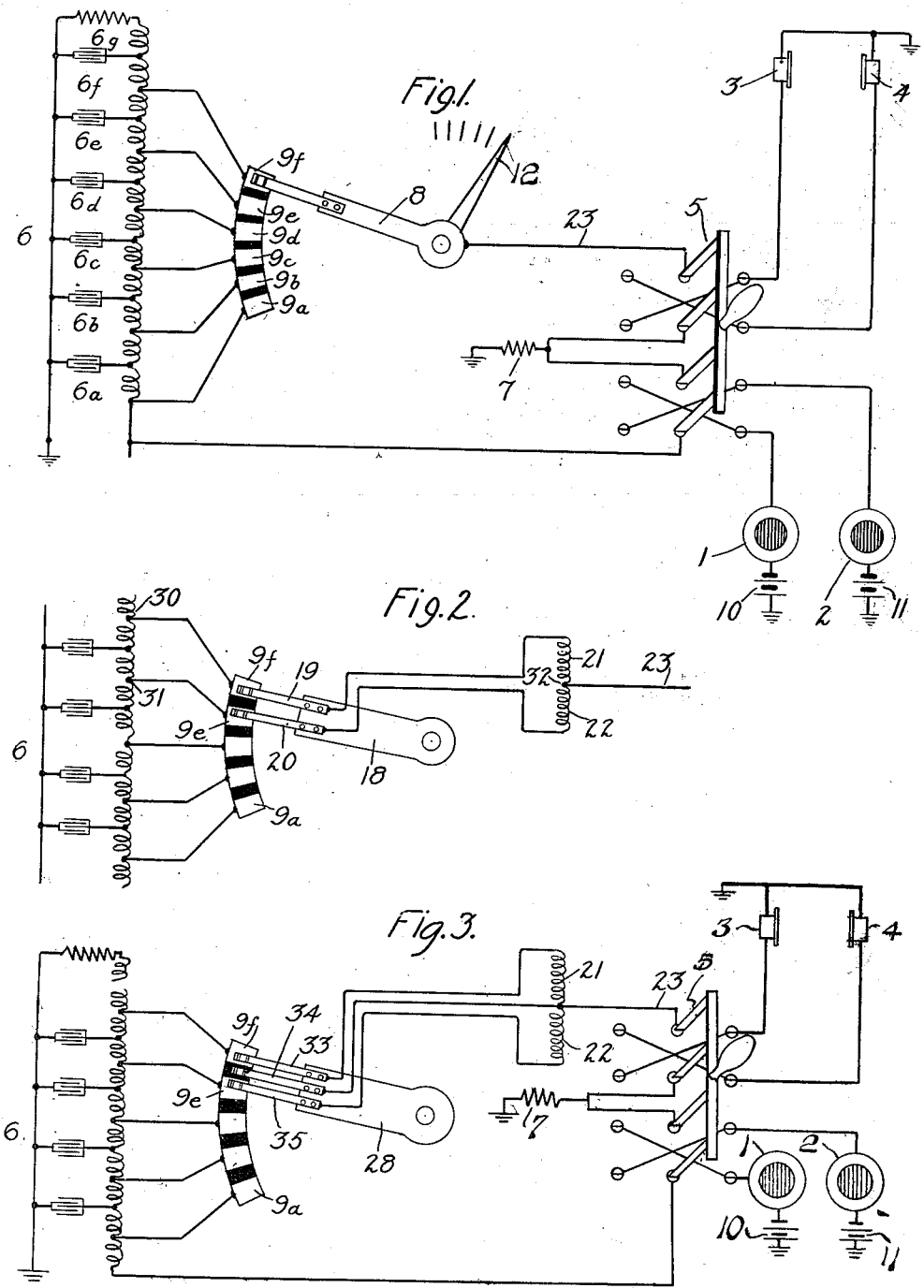
Inventor:
Francis A. Hubbard
by Joel C. R. Palmer
Atty.

Patented Sept. 6, 1927.

1,641,432

UNITED STATES PATENT OFFICE.

FRANCIS ALLEY HUBBARD, OF WEST ENGLEWOOD, NEW JERSEY, ASSIGNOR TO WESTERN ELECTRIC COMPANY, INCORPORATED, OF NEW YORK, N. Y., A CORPORATION OF NEW YORK.

SYSTEM FOR DETERMINING THE DIRECTION OF PROPAGATION OF WAVE ENERGY.

Application filed January 4, 1921. Serial No. 434,976.

This invention relates to a system for determining the direction of propagation of wave energy.

In systems of this sort the direction of propagation of a source of wave energy such as a sound source is determined by measuring the time interval elapsing between the interception of the wave front produced by such source at two fixed but separated points. One method of measuring this time interval consists in converting the wave energy at the intercepting points into variations in electrical circuits by means of detectors such as microphones and separately transmitting these variations to the opposite ears of an observer where they are translated into audible effects by ordinary telephone receivers and retarding one of the effects to bring the two into phase to produce an effect on the observer of a sound coming from directly in front of him. The electrical wave in one transmitting path is retarded by lengthening that particular path relative to the other and this lengthening is accomplished by including between the detector and receiver a variable number of sections of artificial transmission line. A system of this sort is disclosed in my pending application, Serial No. 321,512 filed September 4, 1919.

In accordance with the present invention, however, instead of varying the number of sections of artificial line included between detector and receiver, to determine the required time interval, artificial lines are provided of constant length having associated with one end thereof a detector and with the other end an impedance equal to the surge impedance of the line, and a high impedance phase comparing device such as a pair of telephone receivers is adapted to be connected at various points along the artificial lines to obtain a comparison of the phase of the waves at any given point on the lines during their progress over the lines.

In accordance with a further feature of the invention one of the artificial lines is provided with a number of wave retarding or phase shifting sections and the other is constructed to be without material retarding effect and means are provided to interchangeably connect the detectors with either line depending upon which detector responds first in a given direction determination.

In accordance with still another feature of the invention means are provided to indicate the phase of a wave passing over the artificial line at a point intermediate the ends of a phase shifting section, in order to increase the fineness of the adjustment and consequent accuracy of observation.

These and other features of the invention will more clearly appear from the following specification and the annexed drawings in which Fig. 1 is a diagrammatic showing of the circuit arrangement of one embodiment of the invention and Figs. 2 and 3 are modifications of the arrangement shown in Fig. 1.

In the embodiment of the invention disclosed herein an artificial line is employed of the same type as that described in the application referred to above and involves a number of sections including series inductance and shunt capacity and terminating in pure resistance.

Referring now to Fig. 1 of the drawing, 1 and 2 are two detectors of the microphonic type which may be mounted on a ship below the water line and a fixed distance apart, usually between four and six feet. Separate transmitting paths are provided between these detectors, as will more clearly appear later, and the translating devices or receivers 3 and 4. A four-blade, double-throw switch 5 serves to include the artificial line designated as a whole at 6 with either of said receivers or detectors. The artificial line 6 consists of a plurality of sections such as $6^a$, $6^b$, $6^c$, $6^d$, $6^e$, $6^f$ and $6^g$, including series inductance and shunt capacity, terminated by a resistance which is approximately equal to the surge impedance of the line. Although only a small number of sections are shown, it will be understood that in practice as many sections may be used as is necessary to obtain the amount of retardation required by the maximum time interval which can occur between the arrival of the wave front at the detectors 1 and 2.

There is also provided a resistance 7 which is of the same value as that which is connected to the terminating section $6^g$ and which is designed to be associated with a detector and bridged by a receiver. As a matter of fact the resistance 7 may be considered as an artificial line without phase shifting sections. A switch arm 8 is provided with a brush which is adapted to sweep over and make contact with the contacts such as $9^f$, $9^e$, $9^d$, etc.

It is thought the invention will be best understood, however, from a description of the operation of the system in obtaining a balance for a given sound source.

As a preliminary let it be understood that, although a single balance, comparing the response of two detectors, will be described, the response of a number of pairs of detectors arranged in different positions may be similarly compared for the purpose of removing all ambiguity in the bearing of the sound source which may result if only a single pair of detectors are compared.

With the switch 5 thrown into its right-hand position, it will be assumed that the source of sound is so located with respect to the detectors 1 and 2 that the detector 1 is affected before the detector 2. The response of detector 1 will generate an electrical wave, the course of which may be traced as follows: from grounded source of potential 10, through detector 1, lower right-hand contact of the switch 5, lower switch blade to section $6^a$ of the artificial line and through the artificial line including all the sections to ground. A short time later a similar electrical wave is generated by detector 2 the path of which may be traced from the grounded source of potential 11 which is of the same value as potential 10, through the second lowermost blade of the switch 5, through the resistance 7 to ground. It will be observed that in this position of the switch 5, the receiver 3 is, through the uppermost right-hand contact and upper blade of the switch 5, associated with the switch arm 8, and the receiver 4, through the next lower right-hand contact and switch arm of the switch 5, with the resistance 7. The receivers 3 and 4 are chosen to have an impedance which must be sufficiently high so that the association of these receivers with the artificial lines will not materially affect the current flowing in the two paths and the receivers will function as phase comparing devices of the voltage or potential at the point with which they are associated.

Since the wave generated in the detector 2 is generated later than that in detector 1, the effect in receiver 4, assuming the arm 8 is adjusted so as to rest on contact $9^a$, will be different in phase from that in receiver 3 by an amount which is practically proportional to the time interval between the arrival of the wave front at the two detectors, and the observer will not obtain the so-called binaural balance. However, as the wave generated in the detector 1 will be successively retarded as it passes along the artificial line, 6, by adjusting the arm 8 a point will be reached, for example when the arm 8 is on the contact $9^f$, where the phase of the wave passing through the line 6 is the same as that passing through the path including the detector 2 and resistance 7. Under these conditions a binaural balance will be obtained and consequently the number of intermediate sections or contacts which are necessary to obtain such a balance, and therefore, the time interval in question, and the bearing of the source of sound will be determined. The arm 8 may carry a pointer 12 which passes over a scale that may be calibrated to indicate directly the bearing of the source of sound or of its sound image.

If the wave front is intercepted by the detector 2 before it reaches the detector 1, a balance cannot be obtained with the switch 5 in its right-hand position, so that the switch is thrown into its left-hand position, in which case the operation is identically as previously described except that the detector 2 and receiver 4 are associated with the artificial line 6 and the switch arm 8 respectively and the detector 1 and receiver 3 are associated with the other artificial line.

It will be observed that in either case the earlier generated wave is caused to pass through the artificial line of considerable electrical length and the comparison is effected by determining at what point along the length of such artificial line the phase of the wave therein coincides with that of the later generated wave in the other artificial line. Since the only impedance in the latter transmitting path is a pure resistance there is no material retardation of the wave passing therethrough.

Although it is preferable to use two such artificial lines as above described, one including phase shifting sections and the other without such sections, the two lines could be identical or could include a different number of such sections without departing from the spirit of the invention. In any case the difference measured in phase shifting or electrical length between the two points of the lines is a measure of the time interval between the generation of the electrical waves in the two lines.

In order to obtain a finer adjustment and a closer balance without increasing the number of sections, the arrangement shown in Figs. 2 and 3 may be used. In these figures the switch arms 18 and 28 respectively may be substituted for the switch arm 8. The same artificial line 6 and arrangement of contacts $9^a$—$9^f$ are used and the detectors are associated therewith as in the system of Fig. 1. For the sake of simplifying the diagrams, the switch 5 has been omitted from Figure 2. The switch arm 18 is provided with two brushes 19 and 20, which are narrower than the insulating segments between the successive contact segments 9$^a$—9$^f$, so that it is impossible for a brush to touch two contact segments at the same time. The brush 19 is connected to conductor 23 through an impedance 21 and the brush 20 through an impedance 22, which impedances are equal. With either of the brushes 19 or 20 on an insulating segment, the receiver associated with these brushes compares the phase of the voltage at the point on the artificial line connected to the conducting segment upon which the other brush is resting with the phase of the voltage in the other line. The impedances 21 and 22 are of relatively high value compared with the impedance of the various sections of the artificial line so as not to disturb the progressive retardation phase of the voltage of the wave passing through such line. Thus if the brush 19 is resting on the contact 9$^f$, the receiver associated with the brush will indicate the voltage phase at the point 30 of the artificial line. With the brush 20 resting on the contact 9$^e$ and with the brush 19 resting on an insulating segment, the receiver will indicate the voltage phase at the point 31. In the position shown, with the brushes 19 and 20 resting on the segments 9$^f$ and 9$^e$ respectively, since the impedances 21 and 22 are equal, the voltage at the point 32, to which the receiver is connected, will correspond as to phase with the phase of the wave mid-way between the points 30 and 31 of the artificial line.

In the arrangement shown in Fig. 3, the arm 28 carries three brushes 33, 34 and 35 which are so spaced with reference to the contacts 9$^a$—9$^f$ and the intervening insulating segments that it is impossible for the brushes 33 and 35 to occupy the same conducting segment, although the brush 34 may occupy the same conducting segment as either brush 33 or 35 in which position brush 33 or 35, as the case may be, will occupy the intervening insulating segments. In like manner, if brush 34 is placed centrally on a conducting segment, brush 33 and 35, will occupy adjacent insulating segments. The brush 34 is directly connected to the conductor 23 and either receiver 3 or 4, whereas the brush 33 is connected to the conductor 23 through an impedance such as 21 and the brush 35 to the same point through an equal impedance such as 22. With the brushes 33 and 34 or 34 and 35 occupying a conducting segment such as 9$^f$ or 9$^e$, the impedance 21 or 22, as the case may be, is short circuited and the effect is the same as is obtained in the arrangement of Fig. 1. However, in the position shown in Fig. 3, with the brushes 33 and 35 on adjacent conducting segments 9$^f$ and 9$^e$, and brush 34 on an insulating segment, the result obtained is the same as in the indicated position of Fig. 2. Therefore, either of the arrangements shown in Fig. 2 or Fig. 3 provides for a phase indication equivalent to a half section of artificial line.

It is obvious that, by various other equivalent arrangements of contacts and brushes substantially, as shown by the difference between Figs. 2 and 3 still finer subdivisions along the artificial line can be obtained as pointed out above.

In practice, in addition to choosing the resistance 7 equal to the surge impedance of the artificial line 6, the detectors 1 and 2 are carefully matched as far as electrical characteristics are concerned, as are the receivers 3 and 4, so that the current flowing in both of the transmission paths compared in any case is the same and the receivers serve as a means for measuring or indicating differences in voltage phase between a point on one path and various points on the other path.

What is claimed is:

1. In combination, a pair of transmission lines, one of which includes sections of an artificial line, means for successfully generating similar electrical waves in said lines, an indicating device for each line, means for progressively connecting either of said indicating devices to one of said lines or various sections thereof to compare the phase relation of the waves generated in said lines while maintaining the same electrical condition of said line.

2. In combination, a pair of transmission lines, a detector associated with each line for generating waves therein, a pair of high impedance receivers, switching means for variably associating either of said receivers with different points along the length of one of said lines, and means for alternatively connecting either of said receivers with either of said lines.

3. In combination, a transmission line consisting of inductance units to retard uniformly an electrical wave transmitted thereover, a second transmission line without substantial retarding effect, a pair of translating devices, switching means for interchanging said translating devices and said lines, by which the phase of a wave transmitted over the non-retarding line with the phase at various points along the retarding line of a similar wave transmitted over that line may be compared.

4. In combination, a transmission line including a number of wave retarding sections, joined in succession, said sections consisting of series inductance and shunted capacity a second transmission line, an indicating device comprising two elements by which the phase of the wave transmitted over said first line may be compared with a similar wave transmitted over said second line, and means for associating said elements of said indicating device with said second line and the junction points between said retarding sections.

5. In combination, a pair of electrical transmission lines each line terminating in its surge impedance and one of said lines including phase shifting sections joined in succession, said sections consisting of series inductance and shunt capacity, a pair of high impedance telephones and means for bridging one of said telephones across one of said lines and the other across the junctions of the phase shifting sections of the other of said lines.

6. In combination, a pair of transmission lines, one of which includes an artificial line divided into sections of equal electrical length, a phase comparing device comprising two indicators, means to connect said indicators at opposite ends of a section to compare the phase of a wave transmitted over said line at a point intermediate the ends of the section.

7. In combination, an artificial line divided into sections of equal electrical length, a phase comparing device, comprising two indicators and means for alternatively connecting said indicators either directly with the junction of two sections or with adjacent junction points through equal electrical impedances.

8. In combination, an artificial line divided into sections of equal electrical length, a switch having a contact associated with each junction point between sections, a phase comparing device comprising two elements and a switch arm for alternatively connecting either of said elements with any of said contacts individually and with two adjacent contacts simultaneously.

9. In combination, an artificial line divided into a plurality of sections of equal electrical length, a phase comparing device comprising two elements, a wave switching device having contacts connected to junction points between the sections of said line and a contact arm, said arm cooperating with said contacts and having three brushes, means for connecting contacts of said switching device through one of said brushes directly to either of said elements of said phase comparing device, equal impedance devices, and means for connecting the other two of said brushes simultaneously to either of said elements of said phase comparing device and to adjacent contacts of said switching device through said impedance devices.

10. In combination, a pair of transmission lines, phase comparing apparatus comprising two elements, means to interchangeably connect said elements with a fixed point on one line, and means to interchangeably connect said elements with any one of a plurality of points on the other line.

In witness whereof, I hereunto subscribe my name this 31st day of December A. D., 1920.

FRANCIS ALLEY HUBBARD.